United States Patent
Zhuang et al.

(10) Patent No.: US 9,131,515 B2
(45) Date of Patent: *Sep. 8, 2015

(54) SELECTING FROM AMONG PLURAL CHANNEL ESTIMATION TECHNIQUES

(75) Inventors: Jiandong Zhuang, Ottawa (CA); Xixian Chen, Nepean (CA); Edward Ken Kiu Mah, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 74 days.

This patent is subject to a terminal disclaimer.

(21) Appl. No.: 13/383,721

(22) PCT Filed: Jul. 15, 2010

(86) PCT No.: PCT/IB2010/002070
§ 371 (c)(1),
(2), (4) Date: Jan. 12, 2012

(87) PCT Pub. No.: WO2011/007258
PCT Pub. Date: Jan. 20, 2011

(65) Prior Publication Data
US 2012/0115470 A1    May 10, 2012

Related U.S. Application Data

(60) Provisional application No. 61/225,665, filed on Jul. 15, 2009.

(51) Int. Cl.
*H04W 24/00* (2009.01)
*H04W 72/08* (2009.01)
*H04L 25/02* (2006.01)

(52) U.S. Cl.
CPC ........... *H04W 72/085* (2013.01); *H04L 25/022* (2013.01); *H04L 25/024* (2013.01)

(58) Field of Classification Search
USPC ............ 455/434, 67.11, 67.13, 346; 375/346, 375/350, 219, 227, 285, 295, 340, 521
See application file for complete search history.

(56) References Cited

U.S. PATENT DOCUMENTS 7,848,434 B2    12/2010  Wu et al.
8,095,076 B2 *   1/2012  Aedudodla et al. ........ 455/67.13
(Continued)

FOREIGN PATENT DOCUMENTS

CN     101283559 A    10/2008
EP       1924040 A2    5/2008
(Continued)

OTHER PUBLICATIONS

International Search Report and Written Opinion dated Feb. 2, 2011 for International Application No. PCT/IB2010/002070, International Filing Date: Jul. 15, 2010 consisting of 10-pages.
Office Action in Korean Application No. 10-2012-7002738 dated Apr. 23, 2014 (Korean and English Versions).
Office Action in Japanese Application No. 2012-520122 dated Mar. 31, 2014 (Japanese and English Versions).
(Continued)

*Primary Examiner* — Khawar Iqbal
(74) *Attorney, Agent, or Firm* — Conley Rose, P.C.; J. Robert Brown, Jr.

(57) ABSTRACT

A wireless receiver receives reference signals over a wireless link. The wireless receiver calculates a selection indication based on the received reference signals, and the wireless receiver selects from among plural channel estimation techniques based on the selection indication, where the selected channel estimation technique is usable to perform channel estimation of the wireless link.

19 Claims, 4 Drawing Sheets

(56) References Cited

U.S. PATENT DOCUMENTS

| | | | |
|---|---|---|---|
| 8,130,852 B2* | 3/2012 | Choi et al. | 375/260 |
| 8,675,481 B2 | 3/2014 | Ko et al. | |
| 2001/0028637 A1* | 10/2001 | Abeta et al. | 370/335 |
| 2007/0147533 A1 | 6/2007 | Thomas et al. | |
| 2008/0049598 A1* | 2/2008 | Ma et al. | 370/208 |
| 2008/0049814 A1 | 2/2008 | Jeon | |
| 2008/0049818 A1 | 2/2008 | Taich et al. | |
| 2008/0101306 A1 | 5/2008 | Bertrand et al. | |
| 2008/0146231 A1 | 6/2008 | Huang et al. | |
| 2008/0273641 A1* | 11/2008 | Yang et al. | 375/359 |
| 2009/0207093 A1* | 8/2009 | Anreddy et al. | 343/876 |
| 2009/0245333 A1* | 10/2009 | Krishnamoorthi et al. | 375/219 |
| 2009/0268803 A1* | 10/2009 | Merched et al. | 375/233 |
| 2010/0034174 A1* | 2/2010 | Nishikawa et al. | 370/335 |
| 2010/0039970 A1* | 2/2010 | Papasakellariou et al. | 370/310 |
| 2010/0067464 A1* | 3/2010 | Higuchi | 370/329 |
| 2010/0085925 A1* | 4/2010 | Kishiyama et al. | 370/329 |
| 2010/0130135 A1* | 5/2010 | Wang et al. | 455/67.11 |
| 2010/0158176 A1* | 6/2010 | Luo et al. | 375/350 |
| 2010/0202554 A1 | 8/2010 | Kramer et al. | |
| 2011/0096942 A1* | 4/2011 | Thyssen | 381/94.1 |
| 2012/0008577 A1* | 1/2012 | Han et al. | 370/329 |
| 2012/0275499 A1* | 11/2012 | Anreddy et al. | 375/219 |
| 2014/0112296 A1* | 4/2014 | Ko et al. | 370/329 |

FOREIGN PATENT DOCUMENTS

| | | | |
|---|---|---|---|
| EP | 2124369 A1 | 11/2009 | |
| EP | 2139256 A1 | 12/2009 | |
| JP | 8-265184 A | 10/1996 | |
| JP | 2008124964 | 5/2008 | |
| WO | 2007102654 A1 | 9/2007 | |
| WO | 2008087838 A1 | 7/2008 | |
| WO | 2008114724 A1 | 9/2008 | |

OTHER PUBLICATIONS

Office Action in Chinese Application No. 201080040532.8 dated Jan. 15, 2014.
Qualcomm Europe; "Further Considerations and Link Simulations on Reference Signals in LTE-A"; 3GPP TSG-RAN WG1 #56; R1-090875; Athens, Greece; Feb. 9-13, 2009; pp. 1-6.
Lathaharan Somasegaran; "Channel Estimation and Prediction in UMTS LTE"; Aalborg University, Institute of Electronic Systems, Signal and Information Processing for Communications; Feb. 22-Jun. 25, 2007; pp. 1-49.
Office Action in Russian Application No. 2012103504 dated Jul. 1, 2014 (Russian and English Versions).
Office Action in Japanese Application No. 2012-520122 dated Sep. 12, 2014 (Japanese and English Versions).
Office Action in Chinese Application No. 201080040532.8 dated Aug. 26, 2014 (Chinese and English Versions).
Office Action dated Feb. 13, 2013; U.S. Appl. No. 13/620,737, filed Sep. 15, 2012; 18 pages.
Final Office Action dated Jul. 5, 2013; U.S. Appl. No. 13/620,737, filed Sep. 15, 2012; 11 pages.
Advisory Action dated Sep. 12, 2013; U.S. Appl. No. 13/620,737, filed Sep. 15, 2012; 3 pages.
Office Action dated Feb. 27, 2014; U.S. Appl. No. 13/620,737, filed Sep. 15, 2012; 10 pages.
Office Action dated Jul. 30, 2014; U.S. Appl. No. 13/620,737, filed Sep. 15, 2012; 22 pages.
Notice of Allowance dated Dec. 22, 2014; U.S. Appl. No. 13/620,737, filed Sep. 15, 2012; 22 pages.
Canadian Office Action; Application No. 2,768,150; Feb. 19, 2015; 4 pages.

* cited by examiner

SELECTING FROM AMONG PLURAL CHANNEL ESTIMATION TECHNIQUES

CROSS-REFERENCE TO RELATED APPLICATIONS

This application is a Submission Under 35 U.S.C. §371 for U.S. National Stage Patent Application of International Application Number: PCT/IB2010/002070, filed Jul. 15, 2010 entitled "SELECTING FROM AMONG PLURAL CHANNEL ESTIMATION TECHNIQUES," which claims priority to U.S. Provisional Application Ser. No. 61/225,665, filed Jul. 15, 2009, the entirety of both which are incorporated herein by reference.

BACKGROUND

Various wireless access technologies have been proposed or implemented to enable mobile stations to perform communications with other mobile stations or with wired terminals coupled to wired networks. Examples of wireless access technologies include GSM (Global System for Mobile communications) and UMTS (Universal Mobile Telecommunications System) technologies, defined by the Third Generation Partnership Project (3GPP); and CDMA 2000 (Code Division Multiple Access 2000) technologies, defined by 3GPP2. CDMA 2000 defines one type of packet-switched wireless access network, referred to as the HRPD (High Rate Packet Data) wireless access network.

Another more recent standard that provides packet-switched wireless access networks is the Long Term Evolution (LTE) standard from 3GPP, which seeks to enhance the UMTS technology. The LTE standard is also referred to as the EUTRA (Evolved Universal Terrestrial Radio Access) standard. The EUTRA technology is considered to be fourth generation (4G) technology, to which wireless network operators are migrating to provide enhanced services.

SUMMARY

In general, according to some embodiments, a wireless receiver receives reference signals over a wireless link. The wireless receiver calculates a selection indication based on the received reference signals, and the wireless receiver selects from among plural channel estimation techniques based on the selection indication, where the selected channel estimation technique is usable to perform channel estimation of the wireless link. In one embodiment, calculation of the selection indication is based on determining a quantity reflecting a difference between the reference signals. In one embodiment, the quantity is based on an aggregation of channel frequency responses at plural frequencies. In one embodiment, the quantity is based on an aggregation of channel frequency responses and corresponding samples at the plural frequencies.

Other or alternative features will become apparent from the following description, from the drawings, and from the claims.

BRIEF DESCRIPTION OF THE DRAWINGS

Some embodiments are described with respect to the following figures.

DETAILED DESCRIPTION

Figure 1:
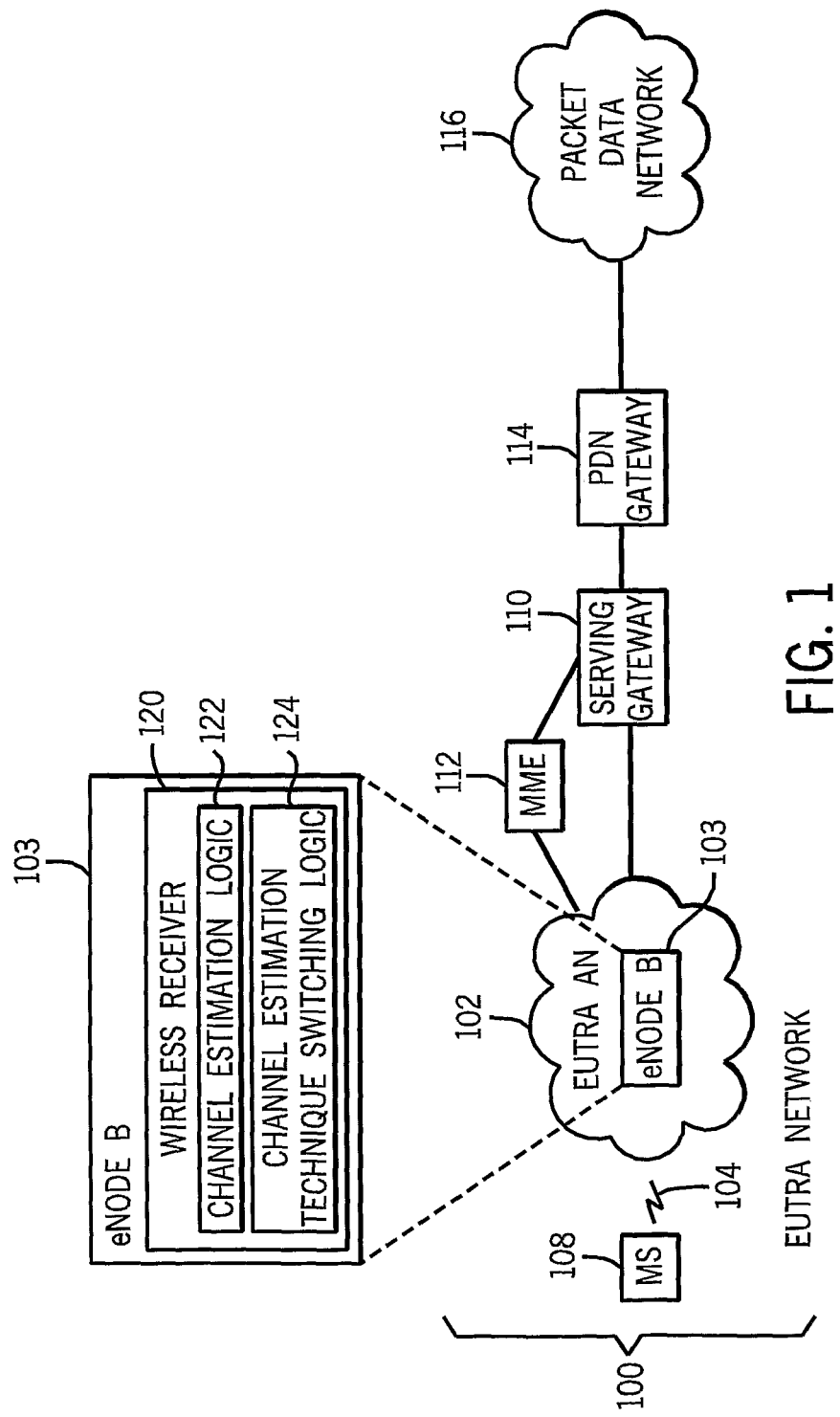
FIG. 1 is a block diagram of an example arrangement including a wireless communications network incorporating some embodiments.

Channel estimation of a wireless link is used to determine a channel response of a wireless link to allow for removal or reduction of interference effects in the wireless link. Accurate channel estimation allows for improved performance in wireless communications in a wireless communications network, such as in the form of higher data rates and/or reduced errors caused by interference.

Multiple channel estimation techniques may be available to perform channel estimation. However, different channel estimation techniques may not be optimal under different conditions. For example, one type of channel estimation technique is based on use of a time-domain averaging algorithm, which works well when a mobile station is moving relatively slowly, but can underperform in high-velocity situations. Another type of channel estimation technique involves use of a time-domain linear interpolation algorithm, which performs well in high-velocity conditions (when the mobile station is moving at a relatively high velocity), but underperforms in low-velocity conditions and in high-noise conditions.

In accordance with some embodiments, techniques or mechanisms are provided to allow for real-time estimation of wireless link conditions so that real-time switching between different channel estimation techniques can be used. Real-time switching between different channel estimation techniques refers to the ability to determine channel conditions during a particular time interval, and to switch between different channel estimation techniques based on the determined channel conditions during that same time interval.

In accordance with some embodiments, the determination of channel conditions for the purpose of performing switching between channel estimation techniques is based on reference signals received over the wireless link. In some implementations, the reference signals are demodulation reference signals (DMRS), which are reference signals used to enable coherent signal demodulation at a wireless receiver. In some examples, the demodulation reference signals are associated with transmission of uplink data and/or control signaling (transmission of data and/or control signaling from the mobile station to the base station). The demodulation reference signals are time-multiplexed with uplink data. The demodulation reference signals assist in estimating channel responses for uplink data so as to effectively demodulate the uplink channel.

Although reference is made to demodulation reference signals in this discussion, it is noted that techniques or mechanisms according to some embodiments can be used with other uplink reference signals. More generally, a "reference signal" refers to a control signal that contains information to allow a wireless receiver to better process information received over a wireless link. Note also that although reference is made to uplink reference signals, in alternative implementations, other types of reference signals can be sent on the downlink (from the base station to the mobile station). Techniques or mechanisms according to some embodiments that allow for switching between different channel estimation techniques based on determined channel conditions can be applied to the uplink or downlink.

FIG. 1 illustrates an example arrangement that includes a wireless communications network, which includes an EUTRA (Evolved Universal Terrestrial Radio Access) wireless access network 102. The EUTRA standard, also referred to as the LTE standard, is defined by the Third Generation Partnership Project (3GPP). The EUTRA wireless access network 102 includes a base station 103, which in the context of the EUTRA is referred to as an enhanced node B (eNodeB). The base station 103 is able to perform wireless communications with a mobile station 108 over a wireless link 104. Although just one base station 103 and one mobile station 108 are depicted in FIG. 1, it is noted that there typically are multiple base stations and mobile stations in a wireless communications network.

A base station can perform one or more of the following tasks: radio resource management, mobility management for managing mobility of mobile stations, routing of traffic, and so forth. Generally, the term "base station" can refer to a cellular network base station or access point used in any type of wireless network, or any type of wireless transmitter/receiver to communicate with mobile stations. The term "base station" can also encompass an associated controller, such as a base station controller or a radio network controller. It is contemplated that the term "base station" also refers to a femto base station or access point, a micro base station or access point, or a pico base station or access point. A "mobile station" can refer to a telephone handset, a portable computer, a personal digital assistant (PDA), or an embedded device such as a health monitor, attack alarm, and so forth.

As depicted in FIG. 1, the mobile station 108 connects wirelessly to the base station 103. The base station 103 is in turn connected to various components, including a serving gateway 110 and a mobility management entity (MME) 112. The MME 112 is a control node for the EUTRA access network 102. For example, the MME 112 is responsible for idle mode mobile station tracking and paging procedures. The MME 112 is also responsible for choosing the serving gateway for a mobile station at initial attach and at time of handover. The MME 112 is also responsible for authenticating the user of the mobile station.

The serving gateway 110 routes bearer data packets. The serving gateway 110 also acts as a mobility anchor for the user plane during handovers between different access networks. The serving gateway 110 is also connected to a packet data network (PDN) gateway 114 that provides connectivity between the mobile station 108 and the packet data network 116 (e.g., the Internet, a network that provides various service, etc.).

Reference to the EUTRA standard is intended to refer to the current EUTRA standard, as well as standards that evolve over time. It is expected that future standards evolve from EUTRA may be referred by different names. It is contemplated that reference to "EUTRA" is intended to cover such subsequently evolved standards as well.

Although reference is made to EUTRA, note that techniques or mechanisms according to some embodiments are applicable for systems employing other types of wireless protocols.

As further depicted in FIG. 1, the base station 103 includes a wireless receiver 120 to receive wireless information (bearer data and control signaling) over the wireless link 104. The wireless receiver 120 includes channel estimation logic 122 (to perform channel estimation of the wireless uplink), and channel estimation technique switching logic 124 (to perform switching between channel estimation techniques in accordance with some embodiments). In some implementations, each logic 122 or 124 can be implemented with corresponding hardware circuitry, or by machine-readable instructions executable on a processor (e.g., microprocessor, microcontroller, an integrated circuit, or other hardware processing device). Although not depicted, the mobile station 108 also includes a wireless receiver, which can also include channel estimation logic and channel estimation technique switching logic similar to those in the wireless receiver 120.

Figure 2:
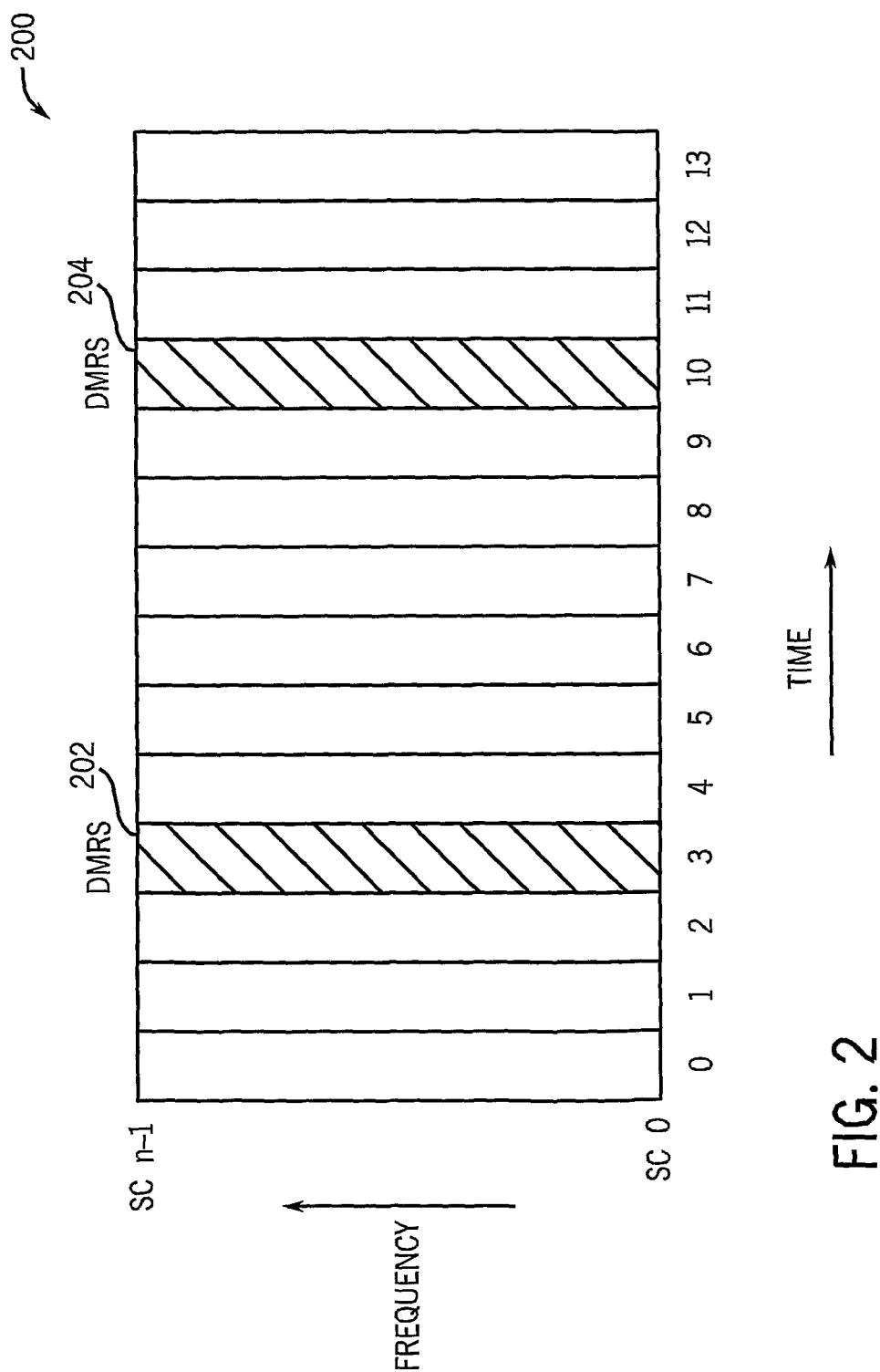
FIG. 2 illustrates a subframe structure having demodulation reference signals useable by a process according to some embodiments.

FIG. 2 illustrates an example uplink subframe structure 200, which corresponds to a TTI (transmission time interval) according to EUTRA. The uplink subframe structure is defined by time along one axis and frequency along the other axis. The different frequencies correspond to different sub-carriers ("SC"), starting with SC 0 and ending with SC n−1. The white rectangles in the uplink subframe structure 200 carry data, whereas the hashed rectangles 202 and 204 carry demodulation reference signal (DMRS) symbols. The DMRS symbol 202 occurs at symbol position 3 in the subframe structure 200, while the DMRS symbol 204 occurs at symbol position 10 in the subframe structure 200.

To determine channel conditions for the purpose of switching between channel estimation techniques, channel information received in the two DMRS symbols 202 and 204 are exploited on a per-TTI basis. The channel information extracted from the DMRS symbols includes two-dimensional channel information in both the time domain and in the frequency domain. By using the two received DMRS symbols in each TTI (represented by the uplink subframe structure 200 of FIG. 2), real-time channel conditions can be determined and switching among multiple channel estimation techniques can be performed on a per-TTI basis.

Figure 3:
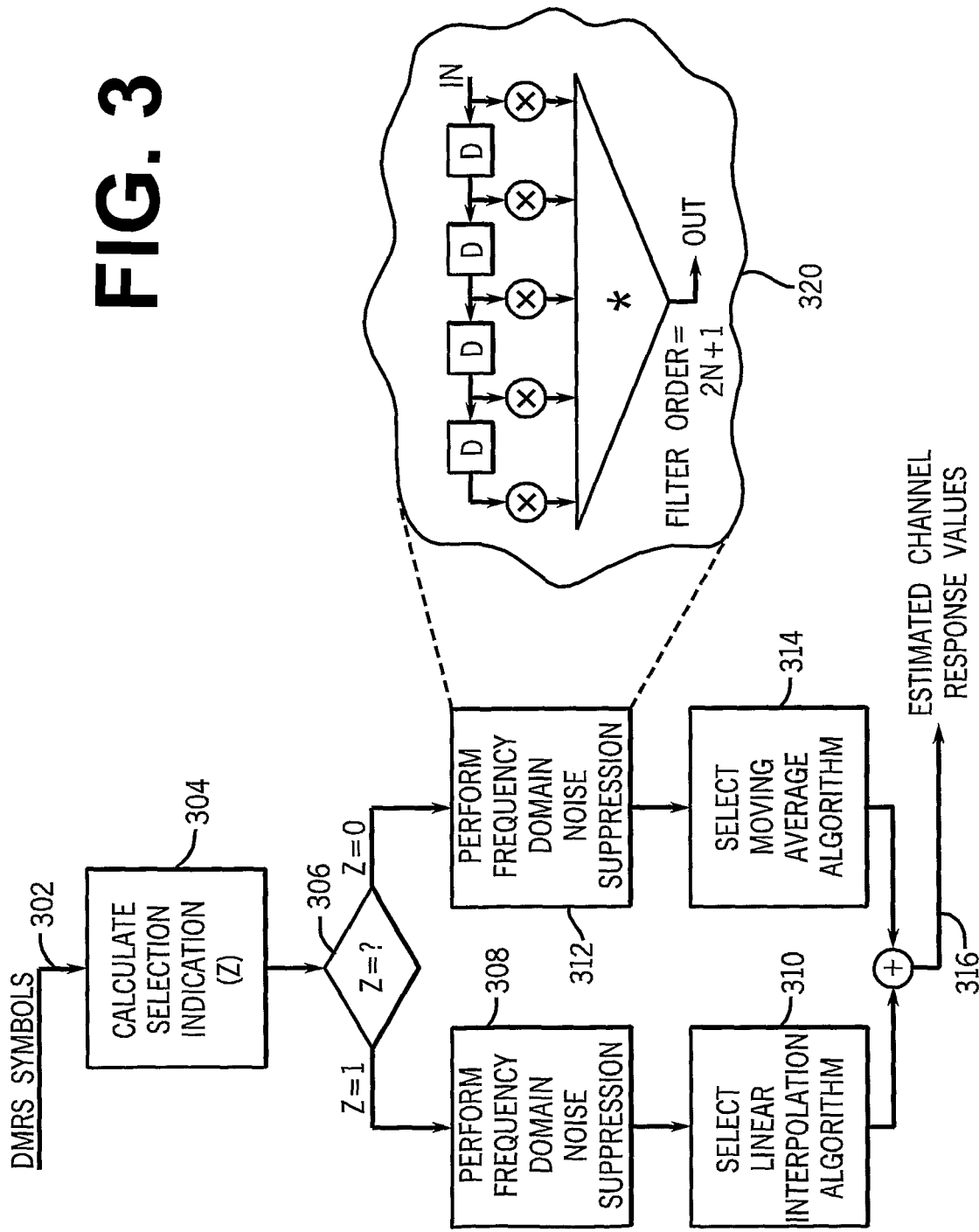
FIG. 3 is a flow diagram of the process of selecting from among multiple channel estimation techniques to perform channel estimation, according to some embodiments.

FIG. 3 is a flow diagram of a process performed by the channel estimation technique switching logic 124 of FIG. 1. The channel estimation technique switching logic 124 receives the two DMRS symbols 202 and 204 in each subframe structure 200 (as indicated by 302 in FIG. 3). Based on the DMRS symbols, DMRS processing is performed to calculate (at 304) a selection indication. In accordance with some example implementations, a selection indication is in the form of a parameter, referred to as Z in the discussed examples. The channel estimation technique switching logic 124 determines (at 306) the state of the parameter Z. If Z has a first value (e.g., Z=1), then frequency domain noise suppression is performed (at 308), and the linear interpolation algorithm is selected (at 310) to perform channel estimation.

On the other hand, if it is determined that Z has a second state (e.g., Z=0), then tasks 312 and 314 are performed, where task 312 involves frequency domain noise suppression, and task 314 involves selection of the averaging algorithm to perform channel estimation.

As depicted in FIG. 3, estimated channel response values are output (at 316), after application of the selected one of the linear interpolation algorithm and the moving average algorithm, to provide the channel estimation output. Although just two different types of channel estimation algorithms are noted in the described embodiments, it is noted that alternative or additional channel estimation algorithms can be used in other embodiments.

The frequency domain noise suppression performed at 308 or 312 in some examples can be based on frequency-domain moving averaging. Noise suppression is used to reduce noise to provide superior channel estimation results. As depicted in FIG. 3, the logic involved in performing the frequency domain moving averaging is represented generally as 320, where the input to the frequency domain moving averaging is represented as "IN" and the output of the frequency domain moving averaging is represented as "OUT." The blocks "D" represent delay blocks, and the "X" circles represent multipliers (which in the example shown in FIG. 3 is multiply-by-⅕). The five multiplied signals are provided to a summer to produce the output. In the example of FIG. 3, the frequency domain moving averaging chooses N=2, which results in a filter order of 5. In other examples, other values of N can be used to provide other types or orders of filters.

The parameter Z is calculated as follows:

$$Z = sgn(F(dmrs1, dmrs2) - Delta), \quad \text{(Eq. 1)}$$

where $$sgn(x) = 1 \text{ if } x > 0, \text{ or } 0 \text{ if } x < 0, \quad \text{(Eq. 2)}$$

and F(*) is a function of dmrs1 and dmrs2 (e.g., DMRS symbols 202 and 204, respectively, in FIG. 2) each including M tones, respectively, as shown below:

$$dmrs1 = \{h1_0, h1_1, \ldots, h1_{M-1}\},$$

$$dmrs2 = \{h2_0, h2_1, \ldots, h2_{M-1}\}, \quad \text{(Eq. 3)}$$

and Delta is a design parameter determined from simulation or testing.

According to some examples, two DMRS symbols each can provide channel frequency response with noise added at a particular time instant in a subframe. The real relationship between channel frequency response and noise can be complicated but for analytical simplicity, one can assume that this relationship can be approximated by a summation of the channel frequency response at the ith subcarrier denoted as $h_i$ and the corresponding noise sample $n_i$, i.e., $$d_i^k = h_i^k + n_i^k \ i = 0, 1 \ldots, M; \text{ and } k = a \text{ for DMRS1 or } b \text{ for DMRS2},$$

where M is the number of used subcarriers and each quantity here is a complex number.

Figure 4A:
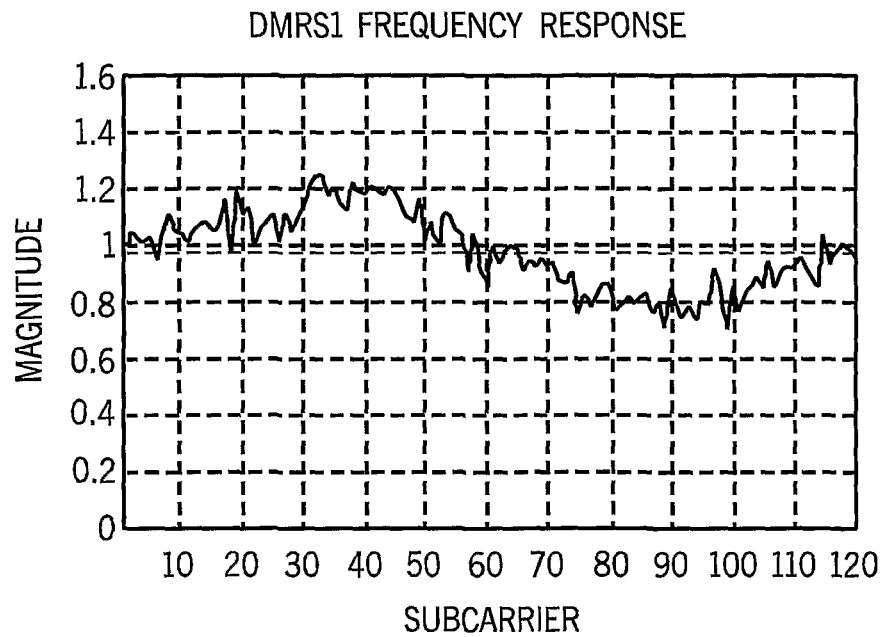
FIGS. 4A-4B illustrate example demodulation reference signal responses.
Figure 4B:
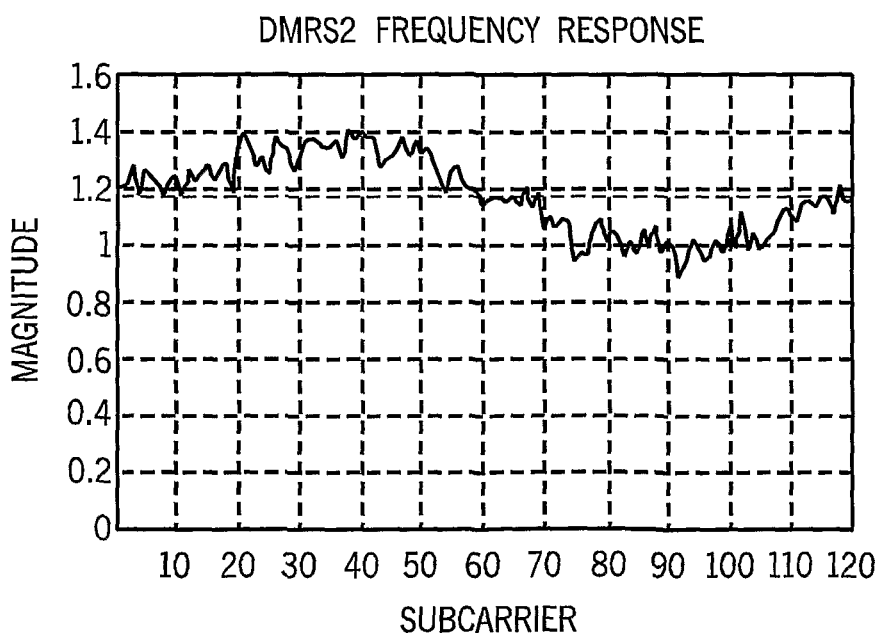

FIGS. 4A and 4B show example frequency responses of DMRS 202 (DMRS1) and DMRS 204 (DMRS2), respectively. As depicted, it is apparent that the two DMRS1 and DMRS2 responses are different—the differences between the two DMRS symbols are used to indicate the channel conditions such that selection between channel estimation techniques can be performed, in accordance with some embodiments.

In the wireless environment, channel frequency response varies with time due to the mobility of a mobile station. Since there is a time offset between DMRS1 and DMRS2 in each subframe, this time variation can be reflected by the difference between two received DMRS symbols (such as depicted in FIGS. 4A-4B). If a quantity (e.g., Z) can be selected to measure this difference, the quantity can be used to recognize how large the channel variation is along the time axis.

In some implementations, the mean of each DMRS sequence is chosen as the quantity to measure the status of each DMRS as a whole, and the status difference between two DMRS symbols is chosen as the quantity to measure the change of DMRS2 relative DMRS1 due to channel frequency response variation across the time period between two DMRS symbols. Therefore, according to some examples, the function, F(*), given previously can be expressed as:

$$z^a = sum(d_i^a)/M = sum(h_i^a)/M + sum(n_i^a)/M \quad \text{(Eq. 4)}$$

$$z^b = sum(d_i^b)/M = sum(h_i^b)/M + sum(n_i^b)/M \quad \text{(Eq. 5)}$$

$$F(dmrs1, dmrs2) = |z^b - z^a|^2 / |z^a|^2 \quad \text{(Eq. 6)}$$

$$= \frac{\begin{pmatrix} (real(z^b) - real(z^a))^2 + \\ (imag(z^b) - imag(z^a))^2 \end{pmatrix}}{(real(z^a)^2 + imag(z^a)^2)}$$

It should be pointed out that the second items in Eqs. 4 and 5 reflect noise suppression effect due to averaging, resulting in noise power reduction from its original power and an improvement of mean estimate of each DMRS. The larger the value of M, the more accurate the estimation will be.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
receiving, by a wireless receiver, reference signals over a wireless link;
calculating, by the wireless receiver, a selection indication based on a quantity reflecting a difference between the received reference signals, the quantity being based on an aggregation of channel frequency responses and corresponding noise samples at plural frequencies; and
selecting, by the wireless receiver, from among plural channel estimation techniques based on the selection indication;
performing, by the wireless receiver, channel estimation of the wireless link using the selected channel estimation technique; and
applying frequency domain noise suppression prior to performing the channel estimation using the selected channel estimation technique.

2. The method of claim 1, wherein receiving the reference signals comprises receiving demodulation reference signals, and wherein calculating the selection indication is based on the demodulation reference signals.

3. The method of claim 1, wherein receiving the reference signals comprises receiving Evolved Universal Terrestrial Radio Access (EUTRA) reference signals.

4. The method of claim 1, wherein the wireless receiver is part of a base station or mobile station.

5. The method of claim 1, wherein selecting from among the plural channel estimation techniques comprises selecting from among an averaging algorithm and an interpolation algorithm.

6. The method of claim 1, wherein the reference signals are in a particular time interval, and wherein other time intervals include other respective groups of reference signals.

7. A wireless receiver comprising:
a channel estimation technique switching logic configured to:
receive reference signals transmitted over a wireless link;
calculate a selection indication based on a quantity reflecting a difference between the received reference signals, the quantity being based on an aggregation of channel frequency responses and corresponding noise samples at plural frequencies;
select from among plural channel estimation techniques based on the selection indication;

perform channel estimation using the selected channel estimation technique;

logic configure to apply frequency domain noise suppression prior to performing the channel estimation using the selected channel estimation technique, wherein the channel estimation technique switching logic includes hardware.

8. The wireless receiver of claim 7, wherein the reference signals comprise one of uplink reference signals and downlink reference signals.

9. The wireless receiver of claim 7, wherein the reference signals comprises demodulation reference signals, and wherein the selection indication is calculated based on the demodulation reference signals.

10. The wireless receiver of claim 7, wherein the reference signals comprises Evolved Universal Terrestrial Radio Access (EUTRA) reference signals.

11. The wireless receiver of claim 7, wherein the reference signals are in a particular time interval, and wherein other time intervals include other respective groups of reference signals.

12. A base station comprising the wireless receiver according to claim 7.

13. A mobile station comprising the wireless receiver according to claim 7.

14. A non-transitory computer product comprising computer-executable instructions, the instructions operable to cause a processor in a wireless receiver to:

receiving, by a wireless receiver, reference signals over a wireless link;

calculating, by the wireless receiver, a selection indication based on a quantity reflecting a difference between the received reference signals, the quantity being based on an aggregation of channel frequency responses and corresponding noise samples at plural frequencies;

selecting, by the wireless receiver, from among plural channel estimation techniques based on the selection indication;

performing, by the wireless receiver, channel estimation of the wireless link using the selected channel estimation technique; and applying frequency domain noise suppression prior to performing the channel estimation using the selected channel estimation technique.

15. The non-transitory computer product of claim 14, wherein receiving the reference signals comprises receiving demodulation reference signals, and wherein calculating the selection indication is based on the demodulation reference signals.

16. The non-transitory computer product of claim 14, wherein receiving the reference signals comprises receiving Evolved Universal Terrestrial Radio Access (EUTRA) reference signals.

17. The non-transitory computer product of claim 14, wherein the wireless receiver is part of a base station or mobile station.

18. The non-transitory computer product of claim 14, wherein selecting from among the plural channel estimation techniques comprises selecting from among an averaging algorithm and an interpolation algorithm.

19. The non-transitory computer product of claim 14, wherein the reference signals are in a particular time interval, and wherein other time intervals include other respective groups of reference signals.

* * * * *

UNITED STATES PATENT AND TRADEMARK OFFICE
CERTIFICATE OF CORRECTION

PATENT NO. : 9,131,515 B2  
APPLICATION NO. : 13/383721  
DATED : September 8, 2015  
INVENTOR(S) : Jiandong Zhuang et al.

Page 1 of 1

It is certified that error appears in the above-identified patent and that said Letters Patent is hereby corrected as shown below:

In the specification,

Column 1, Line 55 replace "corresponding samples" with --corresponding noise samples--

Signed and Sealed this
Tenth Day of May, 2016

Michelle K. Lee
*Director of the United States Patent and Trademark Office*